(12) United States Patent
Di Guardo

(10) Patent No.: US 8,941,353 B2
(45) Date of Patent: Jan. 27, 2015

(54) APPARATUS FOR POWER WIRELESS TRANSFER BETWEEN TWO DEVICES AND SIMULTANEOUS DATA TRANSFER

(75) Inventor: Mario Di Guardo, Gravina di Cantania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 705 days.

(21) Appl. No.: 13/174,021

(22) Filed: Jun. 30, 2011

(65) Prior Publication Data

US 2012/0001593 A1 Jan. 5, 2012

(30) Foreign Application Priority Data

Jun. 30, 2010 (IT) .............................. MI2010A1193

(51) Int. Cl.
| | |
|---|---|
| *H02J 7/00* | (2006.01) |
| *H02J 7/14* | (2006.01) |
| *H04L 27/10* | (2006.01) |
| *B60L 11/18* | (2006.01) |
| *H02J 7/02* | (2006.01) |
| *H02J 17/00* | (2006.01) |

(52) U.S. Cl.
CPC ............... *H04L 27/10* (2013.01); *B60L 11/182* (2013.01); *H02J 7/025* (2013.01); *H02J 17/00* (2013.01)
USPC ............................. 320/108; 320/107; 320/104

(58) Field of Classification Search
CPC ......... H04B 5/0018; H04B 5/00; H02J 7/025; H02J 5/005
USPC ............ 320/104, 108, 112, 114, 115; 307/104
See application file for complete search history.

(56) References Cited

U.S. PATENT DOCUMENTS

| | | | |
|---|---|---|---|
| 5,455,466 A | 10/1995 | Parks et al. | |
| 6,750,560 B1 | 6/2004 | Nishimoto et al. | |
| 7,064,552 B2 * | 6/2006 | Cuylen | 324/428 |
| 2008/0079392 A1 * | 4/2008 | Baarman et al. | 320/108 |
| 2008/0211455 A1 * | 9/2008 | Park et al. | 320/108 |
| 2008/0272889 A1 | 11/2008 | Symons | |
| 2009/0206165 A1 * | 8/2009 | Laackmann et al. | 235/492 |
| 2009/0295223 A1 | 12/2009 | Bauer et al. | |
| 2010/0026236 A1 * | 2/2010 | Kamiyama et al. | 320/108 |
| 2010/0148939 A1 * | 6/2010 | Yamada et al. | 340/10.34 |
| 2010/0270867 A1 * | 10/2010 | Abe | 307/104 |

(Continued)

FOREIGN PATENT DOCUMENTS

EP 1793307 A1 6/2007

*Primary Examiner* — Edward Tso
*Assistant Examiner* — Alexis A Boateng
(74) *Attorney, Agent, or Firm* — Seed IP Law Group PLLC

(57) ABSTRACT

A system for the wireless transfer of power includes a first device connected to a power supply source and provided with a first resonant circuit at a first frequency, a second device comprising at least one battery, provided with a second resonant circuit at said first frequency, arranged at a distance smaller than the wavelength associated with said first frequency and not provided with wires for the electrical connection with said first device. The first device is adapted to transfer a first signal representing the power to be sent to the second device for charging said at least one battery and comprises means adapted to modulate the frequency of said first signal for transferring data from the first device to the second device simultaneously with the power transfer. The second device comprises means adapted to demodulate the received signal, corresponding to the first signal sent from the first device, to obtain the transmitted data.

17 Claims, 5 Drawing Sheets

(56) References Cited

U.S. PATENT DOCUMENTS

| | | | |
|---|---|---|---|
| 2010/0320962 A1* | 12/2010 | Sekita et al. | 320/108 |
| 2011/0018494 A1* | 1/2011 | Mita | 320/108 |
| 2011/0018495 A1* | 1/2011 | Komiyama | 320/108 |
| 2011/0025265 A1* | 2/2011 | Mochida et al. | 320/108 |
| 2011/0043050 A1 | 2/2011 | Yabe et al. | |
| 2011/0127952 A1* | 6/2011 | Walley et al. | 320/108 |
| 2011/0316475 A1* | 12/2011 | Jung et al. | 320/108 |

\* cited by examiner

APPARATUS FOR POWER WIRELESS TRANSFER BETWEEN TWO DEVICES AND SIMULTANEOUS DATA TRANSFER

BACKGROUND

1. Technical Field

The present disclosure relates to an apparatus for power wireless transfer between two devices and simultaneous data transfer.

2. Description of the Related Art

Power wireless transfer between first and second devices is known in the state of the art, e.g., for recharging the battery of a mobile phone or of an electro-medical apparatus; the magnetic field generated by a resonant inductive coupling between the two devices is exploited to wirelessly transfer power.

The first device or source device comprises a resonant circuit of series type formed by a coil L1 having air as an insulator and a capacitor C1 connected in series to the coil and to a resistor R1.

The second device comprises a resonant circuit of parallel type with a coil L2 on a plastic or ceramic support which is arranged in parallel to a capacitor C2 and a resistor R2. Both the resonant circuits of the devices are tuned to resonate at the same resonant frequency fo and for which the relation $$fo = \frac{1}{2 \cdot \pi \cdot \sqrt{L \cdot C}}$$

is true, with L1*C1=C2*L2=L*C. The impedance of the circuit at the resonant frequency is minimal for the series circuit and maximum for the parallel circuit. The quality coefficient is defined for both circuits, considering the losses due to parasitic elements; with Q1 indicating the quality coefficient of the series circuit, the result is $$Q1 = \frac{2 \cdot \pi \cdot fo \cdot L}{R1} = \frac{1}{R1}\sqrt{\frac{L}{C}}$$

and with Q2 indicating the quality coefficient of the parallel circuit, the results is $Q2 = 2 \cdot \pi \cdot fo \cdot C \cdot R2$.

The coupling coefficient between the two circuits is $$K = \frac{M}{\sqrt{L1 \cdot L2}}$$

where M is the mutual inductance between the two coils. If the two series and parallel circuits are aligned along the axis and there are no power exchanges with the nearby bodies, the power exchanged may be considered equal to $P1 = Ps \cdot Q1 \cdot Q2 \cdot \eta 1 \cdot \eta 2 \cdot K^2$ where Ps is the power available to the series resonant circuit of the source device and $\eta 1$ and $\eta 2$ are the efficiencies of the two devices, where the first device is the power transmitting circuit and the second device is the power receiving circuit.

BRIEF SUMMARY

One embodiment of the present disclosure is a system for wirelessly transferring power between two devices, in which data transfer between the two devices simultaneously occurs.

In one embodiment, the system includes a first device connected to a power supply source and provided with a first resonant circuit at a first frequency, a second device comprising at least one battery, provided with a second resonant circuit at said first frequency, arranged at a distance which is smaller than the wavelength associated with said first frequency and not provided with wires for the electrical connection to said first device. The first device is configured to transfer a first signal representing the power to be sent to said second device for charging said at least one battery, and comprises a modulator configured to modulate the frequency of said first signal for transferring data from said first device to said second device simultaneously with the transfer of power. The second device includes a demodulator configured to demodulate the received signal, corresponding to the first signal sent from said first device, to obtain the transmitted data.

In accordance with one embodiment of the disclosure, the data transfer between the first device and the second device occurs bi-directionally and simultaneously (full-duplex).

BRIEF DESCRIPTION OF THE SEVERAL VIEWS OF THE DRAWINGS

The features and advantages of the present disclosure will become apparent from the following detailed description of practical embodiment thereof, shown by way of non-limiting example in the accompanying drawings, in which.

DETAILED DESCRIPTION

Figure 1:
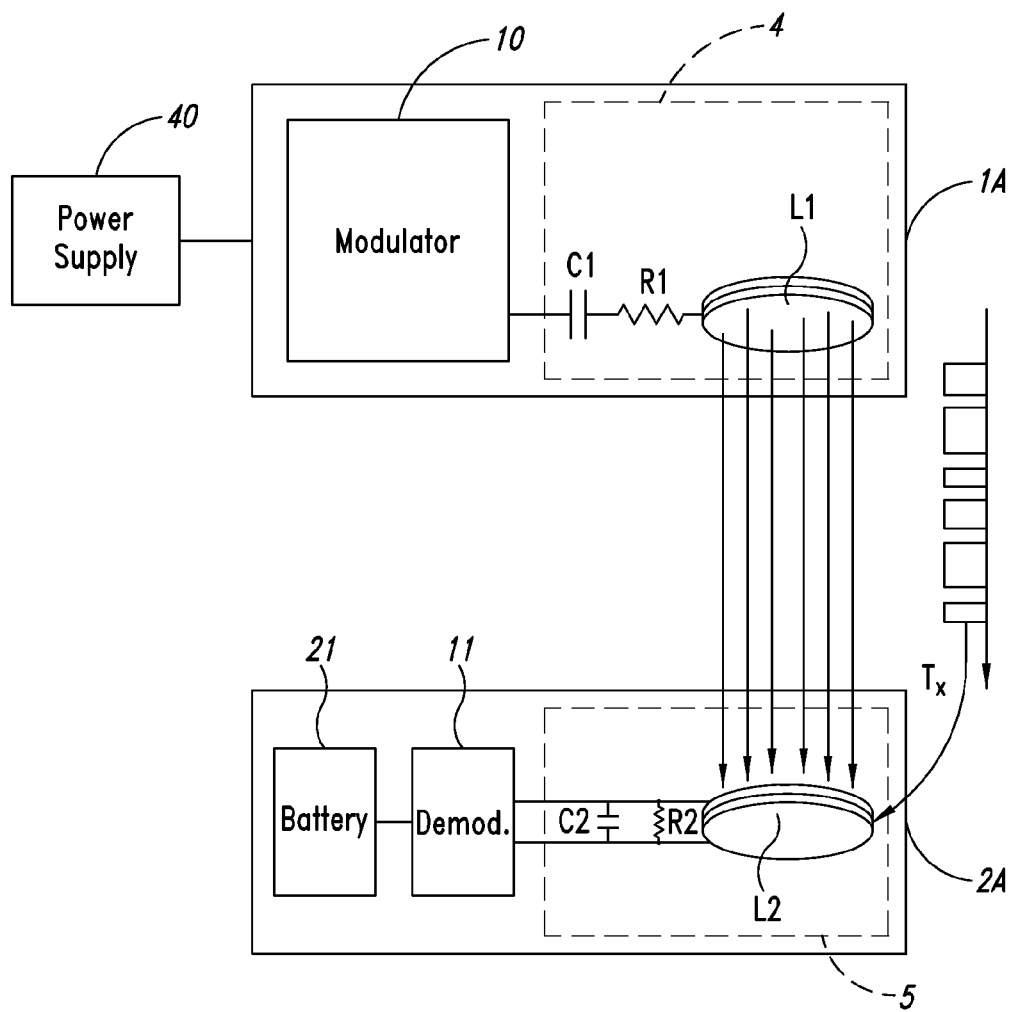
FIG. 1 shows an apparatus for power wireless transfer between two devices and simultaneous data transfer in accordance with an embodiment of the disclosure.

With reference to FIG. 1, a system for wirelessly transferring power E between a first device 1A (or source device) and a second device 2A is shown, in which data transfer simultaneously occurs between the two devices. The source device 1A includes a first resonant circuit 4 and is supplied by a power supply source 40 which supplies a power supply voltage Vac. The resonant circuit 4 is preferably a series resonant circuit comprising a coil L1, having air as an insulator, a resistor R1, and a capacitor C1 connected in series with each other. The second device 2 comprises at least one battery 21 and a second resonant circuit 5, preferably a parallel resonant circuit with a coil L2, on a plastic or ceramic support, a capacitor C2, and a resistor R2 arranged in parallel with each other. Both the resonant circuits 4, 5 of the devices are tuned to resonate at the same resonant frequency fo, e.g., of 1.4 MHz, and for which the relation $$fo = \frac{1}{2 \cdot \pi \cdot \sqrt{L \cdot C}}$$

is true, with L1*C1=C2*L2=L*C. The impedance of the circuit at the resonant frequency is minimal for the series circuit 4 and maximal for the parallel circuit 5. The quality coefficient is defined for both circuits, considering the losses due to parasitic elements; with Q1 indicating the quality coefficient of the series circuit 4, the result is $$Q1 = \frac{2 \cdot \pi \cdot fo \cdot L}{R1} = \frac{1}{R1}\sqrt{\frac{L}{C}}$$

and with Q2 indicating the quality coefficient of the parallel circuit 5, the result is Q2=2·π·fo·C·R2. The devices 1A and 2A are arranged at a distance Dis smaller than the wavelength of the resonant frequency fo. The transfer of power E occurs by transferring a signal representing the power E to be sent, e.g., a current signal Itransfer.

Figure 2:
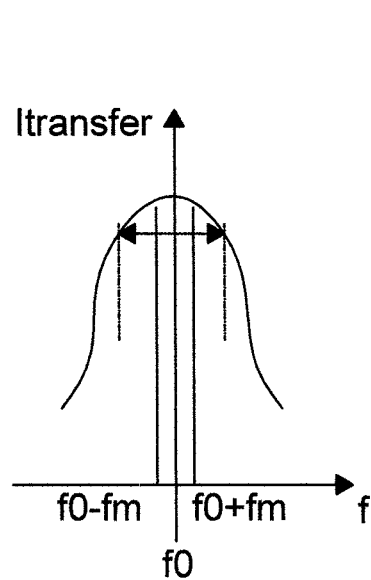
FIG. 2 shows the diagram of the current Itransfer at the resonant frequency fo.
Figure 3:
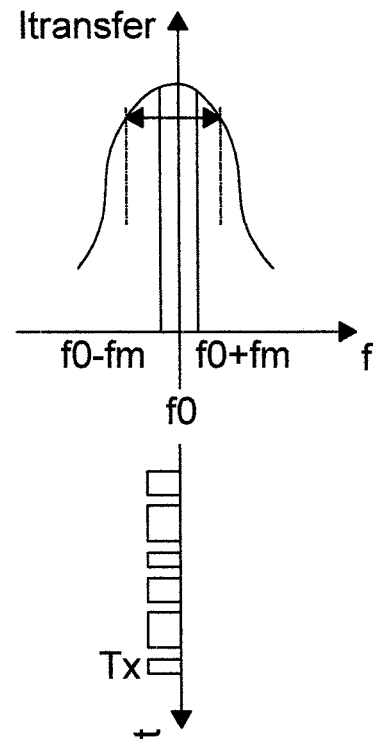
FIG. 3 shows the diagram of the current Itransfer at the resonant frequency fo with the digital signal Tx to be transmitted.

In addition to the transfer of power E, simultaneous data transfer also occurs between the devices 1A and 2A. Device 1A comprises a modulator 10 adapted to use the current signal Itransfer as a carrier the frequency of which is conveniently modulated; device 2A comprises means 11 adapted to receive and demodulate the received current signal Itransfer', corresponding to the current signal Itransfer sent from device 1A. The current signal Itransfer is typically centered on the resonant frequency fo to which the devices 1A and 2A are tuned, as shown in the diagram in FIG. 2. Means 10 modulate the frequency of the current signal Itransfer by deviating it by a quantity fo−fm or fo+fm but such as to prevent the oscillation of the circuit of device 1, i.e., of the circuit of the transmitting device, from occurring outside the bell-shaped resonant curve (FIG. 3) and such as to prevent the oscillation frequency from being out of the bandwidth of the transmitting and receiving circuit. All deviations of the oscillation frequency by the quantity fm, i.e., fo−fm or fo+fm, will indicate the transmission of a logic signal "1" while the lack of oscillation deviation from the frequency fo will indicate the transmission of a logic signal "0"; thereby a digital signal Tx is transmitted from the first device 1 to the second device 2.

Figure 4:
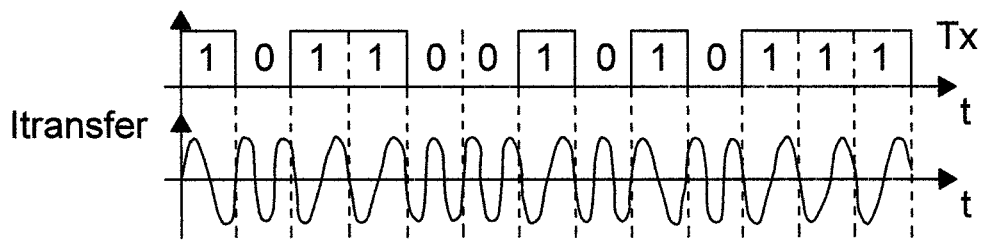
FIG. 4 shows the frequency modulation of the current Itransfer for transmitting the digital signal Tx.

An FSK modulation of the carrier Itransfer is thus achieved such as e.g., shown in FIG. 4. Thereby information, i.e., the digital signal Tx, may be transferred from the transmitting device 1A to the receiving device 2A which is provided with means 11 capable of decoding the information contained in the signal Itransfer'.

Figure 5:
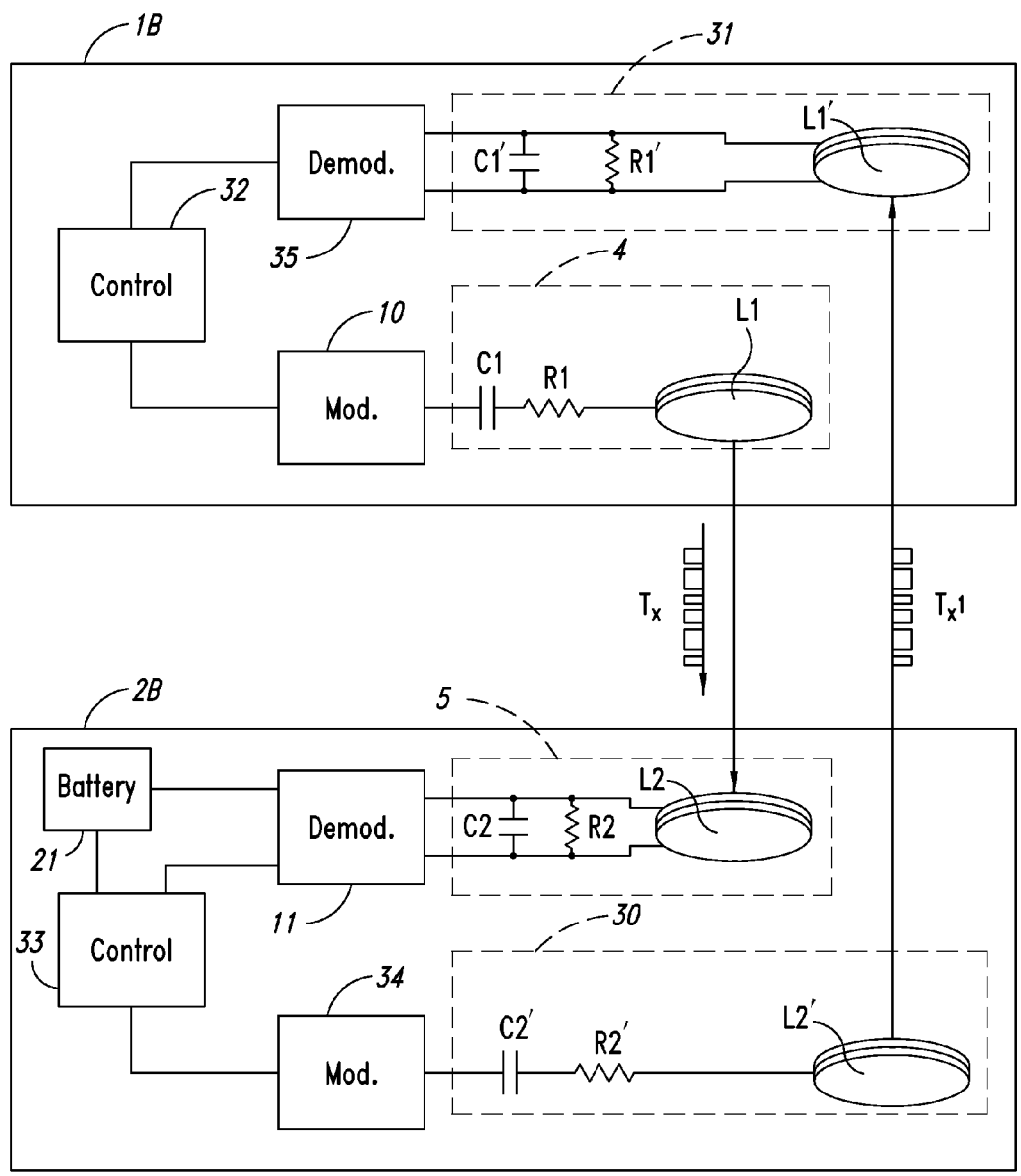
FIG. 5 shows an apparatus for power wireless transfer between two devices and simultaneous data transfer in accordance with a variant of the embodiment of the disclosure.

One embodiment of the present disclosure is a full duplex system for bi-directionally and simultaneously transmitting data, as shown in FIG. 5. In particular, the system includes first and second devices 1B, 2B that are respectively like the first and second devices 1A, 2A of the first embodiment in that the first device 1B includes the modulator 10 and first resonant circuit 4; and the second device includes the demodulator 11 and the second resonant circuit 5. In addition, second device 2B comprises a third resonator circuit 30 for transmitting data to the first device 1B, e.g., a digital signal Tx', and device 1B comprises a fourth resonator circuit 31 to receive the digital signal Tx'.

The third and fourth resonant circuits 30, 31 are tuned to a resonant frequency fsec different from the frequency fo and lower or higher than the frequency fo so that there are no interferences between the radiation field at the frequency fo and the one at the frequency fsec. Preferably, the frequency fsec is less than ¼ as compared to the frequency fo. The third resonant circuit 30 uses a carrier, e.g., a power-reduced current signal Isec; the power value of the carrier Isec is low as compared to the carrier Itransfer, e.g., has a value of 1% to 10% of Itransfer, but so that the signal/noise ratio S/N being received is maximum. The signal/noise ratio S/N is higher in correspondence of a greater ratio of the root mean squares of the usable voltage Veff at the receiver, generated by the current Isec', and of the noise voltage Vr, and of a greater frequency deviation between the frequency fsec and the noise frequency fr; the signal/noise ratio S/N should preferably be at least of 20 decibels. The resonant circuit 30 for the second device 2B includes an inductor L1', resistor R1', and a capacitor C1' for the second device 1, and the resonant circuit 31 for the first device 1B includes an inductor L2', a resistor R2, and a capacitor C2'. The resonant circuit 30 of device 2B modulates the frequency of the current signal Isec by deviating it by a quantity fsec−fm or fsec+fm but such as to prevent the oscillation of the circuit of device 2B, i.e., of the circuit of the transmitting device, from occurring outside the bell-shaped resonant curve and such as to prevent the oscillation frequency to be out from the bandwidth of the transmitting and receiving circuit. All deviations of the oscillation frequency by the quantity fsec−fm or fsec+fm will indicate the transmission of a logic signal "1", while the lack of oscillation deviation from the frequency fsec will indicate the transmission of a logic signal "0"; thereby a modulation FSK of the carrier Isec is obtained and a digital signal Tx' is transmitted from the second device 2B to the first device 1B.

The use of the third and fourth resonant circuits 30, 31 in addition to the first and second resonant circuits 4, 5 enables the simultaneous data communication of devices 1B, 2B to be of full-duplex type. In this way, the time for the data communication is not lost, no data packet must be re-transmitted because the transmission is collision free, and all of the band is available in both directions because the transmission is separated from the reception function. Also, the elements in communication with each other are not required to wait for the other transmission operation to be completed. A communication system formed by only the coils L1 and L2, without the third and fourth resonant circuits 30, 31, would allow a half-duplex communication—the communication could occur in both directions but not simultaneously. In such a system, when the receiver element receives data, it would need to wait for the transmitter element to end the data transmission before transmitting its own data.

A material such as ferrite may be used to increase the magnetic induction vector to obtain improved amplification of the received signal. The coils L1' and L2' of the resonant circuits 30, 31 may be placed close to the power field, i.e., close to the coils L1 and L2 or within the coils themselves.

The devices 1B and 2B comprise microcontrollers 32, 33 for managing wireless data transmission, data reception and power transmission and reception; the devices 2B and 1B comprise modulation means 34 and demodulation means 35, respectively, for modulating the signal Isec for sending information with frequency modulation and for receiving and decoding the received signal Isec'.

Figure 6:
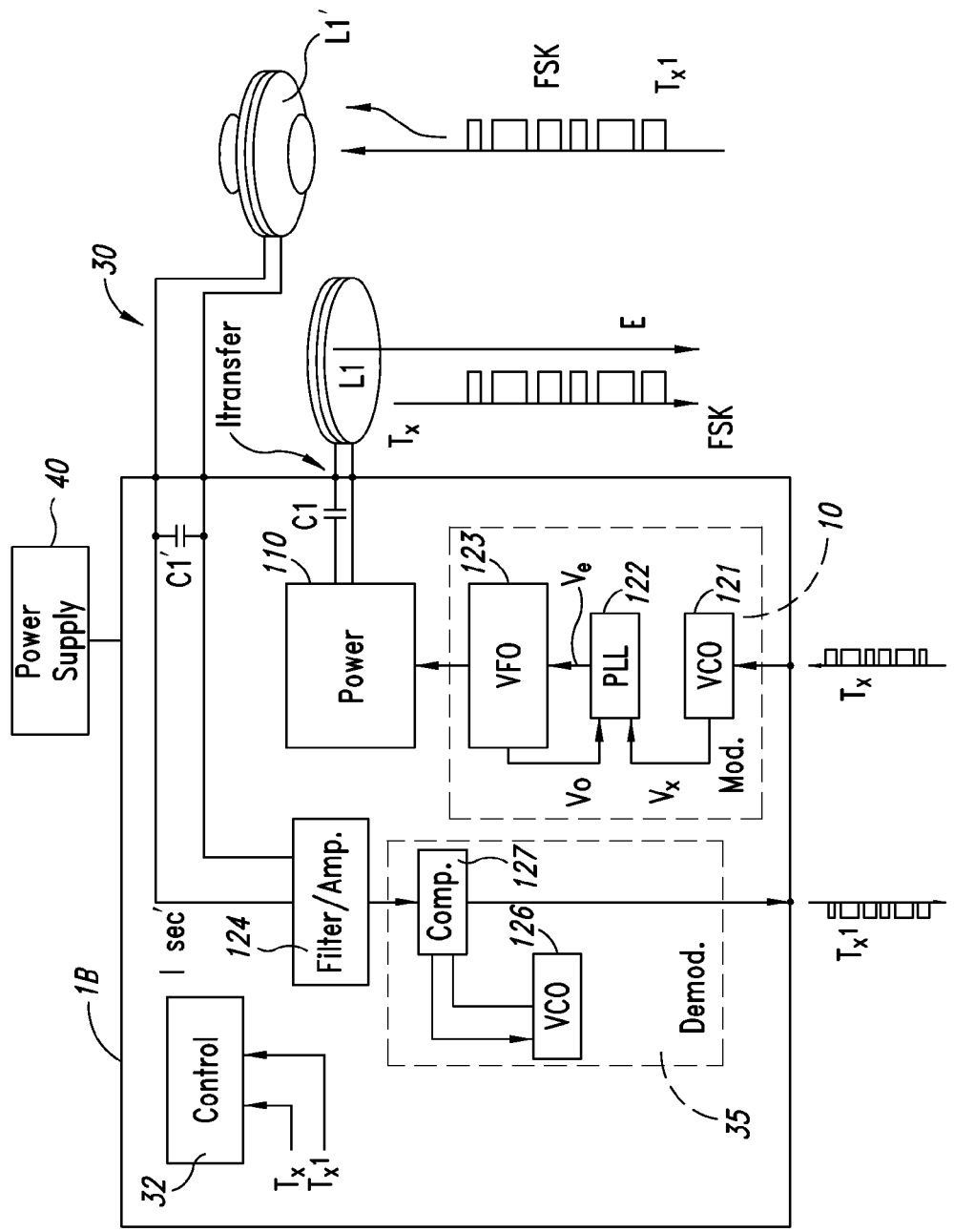
FIGS. 6 and 7 show circuit implementations of the first and second devices, respectively, which belongs to the apparatus in FIG. 5.
Figure 7:
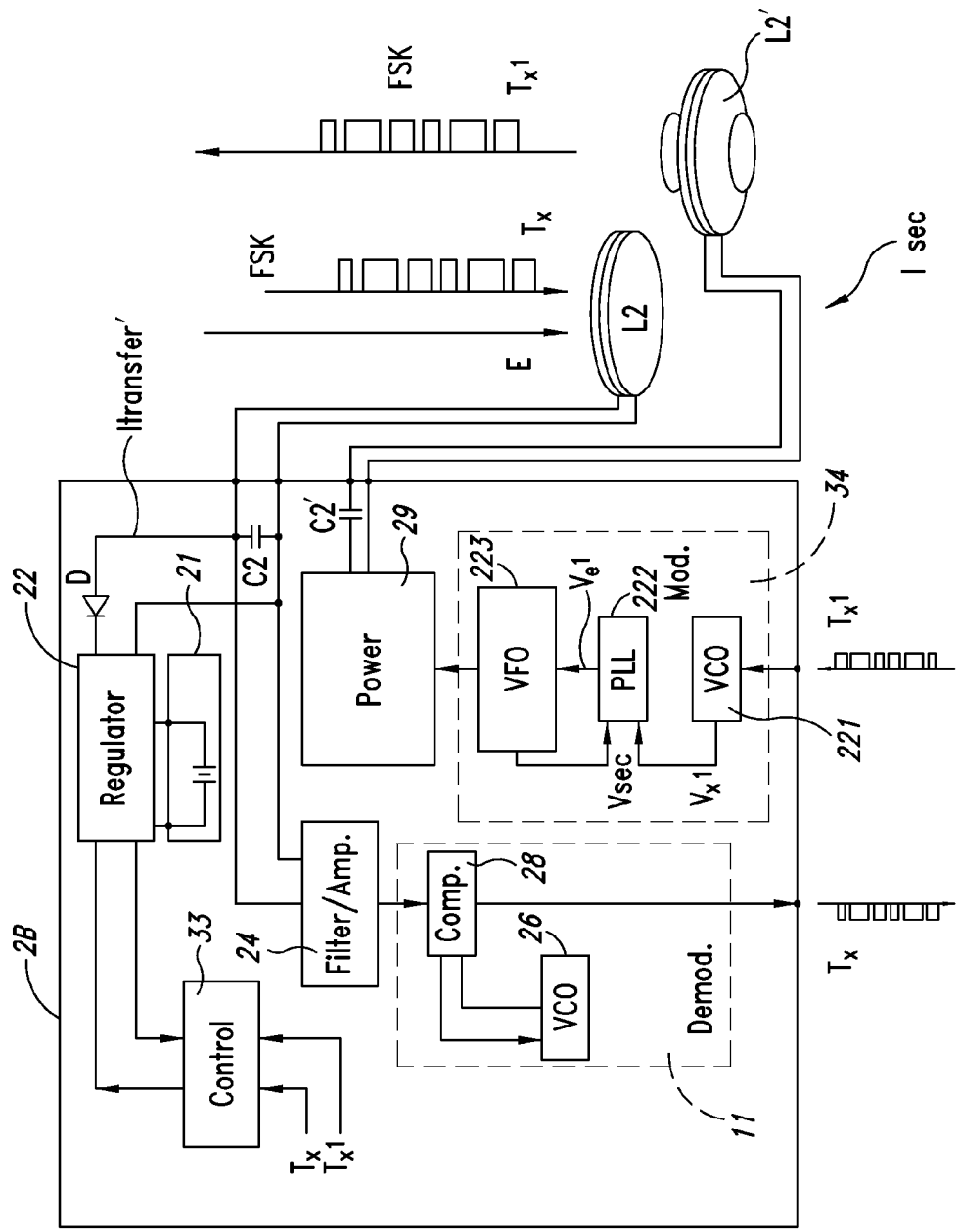

FIGS. 6 and 7 show respective circuit implementations of the devices 1B and 2B. The first resonant circuit 4 of the first device is supplied by a circuit block 110, i.e., a high frequency power stage coupled to the modulator 10 and capable of amplifying a high frequency sinusoidal signal generated by the modulator 10. The resonant circuit 4, comprising the inductor L1 and the capacitor C1 (and the resistor R1 not shown in FIG. 6), is adapted to transfer power E to the second device 2B. Modulator 10 comprises a voltage-controlled oscillator or VCO 121 adapted to generate a frequency value at a logic "0" and to generate another frequency value, different from the previous one, at a logic "1"; the VCO 121 is controlled by the digital signal Tx to be transmitted. The frequency variation corresponds to the variation fo−fm or fo+fm to allow data to be transferred. A phase locked device PLL 122 compares the output signal Vx from the VCO 121 with the signal Vo produced by a voltage-controlled, sinusoidal oscillator or VFO 123 tuned to frequency fo. The error output Ve=Vo−Vx of the block PLL 122 is sent to the block 123 which will generate a signal tuned to the error frequency, i.e., it will generate a carrier at the frequency fo at a logic "0" and a carrier at the frequency fo−fm or fo+fm at a logic "1".

The first device 1B also comprises a receiving section that includes the resonant circuit 30, with the inductor L1' and the capacitor C1' which are tuned to the frequency fsec. The obtained signal Isec' is sent to a circuit block 124 which filters the signal, amplifies it and squares it. The output signal from block 124 is sent to the demodulator 35 which translates the frequency variations of the signal Isec into a logic signal with "1" and "0". Demodulator 35 comprises a VCO 126 which is locked at the incoming frequency of the carrier Isec' and unlocked when the incoming frequency deviates from the value of the carrier received by the resonant circuit L1', C1'; a comparator 127 has the output signal from VCO 126 at its input, and reconstructs the signal Tx'.

All circuit blocks 35 and 121-127 are managed by the microcontroller 32.

The resonant circuit 5, including the inductor L2 and the capacitor C2 which are tuned to the frequency fo, of the second device receives the power signal E sent from the first device 1B. The received current signal Itransfer' is rectified by a diode D and is used to recharge the battery 21 using the voltage regulator circuit 22. The microcontroller 33 is adapted to establish the charge profiles of the battery and to manage the other circuit blocks of device 2B; the signal Itransfer' is sent to a filter/amplifier circuit block 24 which filters the signal, amplifies it and squares it. The output signal from block 24 is sent to the demodulator 11 which translates the frequency variations of the signal Itransfer' into a logic signal with "1" and "0". The demodulator 11 comprises a VCO 26 which is locked at the incoming frequency of the carrier Itransfer' and unlocked when the incoming frequency deviates from the value of the carrier received by the resonant circuit 5 with the elements L2 and C2. A comparator 28 has the output signal from the VCO 26 at its input, and reconstructs the logic signal Tx which is transmitted.

The third resonant circuit 30, comprising the inductor L2' and the capacitor C2' of the second device 2, is supplied by a circuit block 29, i.e., a power stage at a frequency far from the frequency fo, capable of amplifying a low frequency sinusoidal signal generated by the modulator 34. The resonant circuit 30 is adapted to transfer a signal Isec to the first device 1. The modulator 34 comprises a voltage-controlled oscillator or VCO 221 controlled by the signal Tx' to be transmitted and adapted to generate a frequency value at a logic "0" and to generate another frequency value, different from the previous one, at a logic "1". The frequency variation corresponds to the variation fsec−fm or fsec+fm to allow data to be transferred. A phase locked device or PLL 222 adapted to compare the output signal Vx' from the VCO 221 with the signal Vsec produced by a voltage-controlled sinusoidal oscillator or VFO 223 tuned to the frequency fsec. The error output Ve' of the block PLL 222 is sent to the block 223 which will generate a signal tuned to the error frequency, i.e., it will generate a carrier at the frequency fsec at a logic "0" and a carrier at the frequency fsec−fm or fsec+fm at a logic "1". The current signal Isec will be transmitted to device 1.

All circuit blocks 11, 34 are managed by the microcontroller 33.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
   a battery;
   a first resonant circuit configured to resonate at a first frequency, the first resonant circuit including a first coil and being configured to wirelessly receive a first signal having a power configured to charge said battery and including data;
   a second resonant circuit configured to resonate at a second frequency, the second resonant circuit including a second coil and being configured to wireless transmit a second signal;
   a demodulator configured to demodulate the first signal to obtain the transmitted data and charge the battery with the power from the first signal; and
   a modulator configured to modulate the second frequency of said second signal for transferring data externally, wherein the first and second resonant circuits, the demodulator, and the modulator are configured to provide full-duplex communication with external devices, wherein said modulator is configured to modulate said second signal by setting a frequency deviation by a determined quantity from said second frequency, said determined quantity being such as to prevent oscillation of the second resonant circuit from occurring outside a bell-shaped resonant curve centered on said second frequency and such as to prevent a frequency of the oscillation from being outside bandwidth of the second resonant circuit.

2. The apparatus according to claim 1, wherein said modulator is configured to provide a first logic value corresponding to a deviation of the oscillation frequency from the second frequency by said determined quantity and is configured to provide a second logic value corresponding to a lack of oscillation deviation from said second frequency.

3. The apparatus according to claim 1, wherein said second frequency has a different value than the first frequency such as to ensure that no interference exists between a radiation field at the first frequency and a radiation field at the second frequency.

4. The apparatus according to claim 1, wherein said second signal has a reduced power content such as to obtain a signal/noise ratio higher than 20 decibels.

5. The apparatus according to claim 1, wherein said second frequency is lower than one-fourth of the first frequency.

6. A system for wirelessly transferring power, comprising:
   a first apparatus that includes:
   a battery;
   a first resonant circuit configured to resonate at a first frequency, the first resonant circuit including a first coil and being configured to wirelessly receive a first signal having a power configured to charge said battery and including data;

a second resonant circuit configured to resonate at a second frequency, the second resonant circuit including a second coil and being configured to wireless transmit a second signal;

a first demodulator configured to demodulate the first signal to obtain the transmitted data and charge the battery with the power from the first signal; and a first modulator configured to modulate the second frequency of said second signal for transferring data externally, wherein the first and second resonant circuits, the first demodulator, and the first modulator are configured to provide full-duplex communication with external devices; and a second apparatus including:

a third resonant circuit configured to resonate at the first frequency, the third resonant circuit including a third coil and being configured to wirelessly transmit the first signal to the first device;

a fourth resonant circuit configured to resonate at the second frequency, the fourth resonant circuit including a fourth coil and being configured to wirelessly receive the second signal;

a second modulator configured to modulate the frequency of said first signal; and a second demodulator configured to demodulate the second signal from said second device, wherein the third and fourth resonant circuits, the second demodulator, and the second modulator are configured to provide full-duplex communication with the first apparatus, wherein said first modulator is configured to modulate said second signal by setting a frequency deviation by a first quantity from said second frequency, said first quantity being such, as to prevent oscillation of the second resonant circuit from occurring outside a bell-shaped resonant curve centered on said second frequency and such as to prevent a frequency of the oscillation from being outside a bandwidth of the second resonant circuit.

7. The system according to claim 6, wherein the first modulator is configured to provide a first logic value corresponding to a deviation of the oscillation frequency from the second frequency by said determined quantity and is configured to provide a second logic value corresponding to a lack of oscillation deviation from said second frequency.

8. The system according to claim 6, wherein said second modulator is configured to modulate said first signal by setting a frequency deviation by a second quantity from first second frequency, said second quantity being such as to prevent oscillation of the first resonant circuit from occurring outside a bell-shaped resonant curve centered on said first frequency and such as to prevent a frequency of the oscillation from being outside a bandwidth of the first resonant circuit.

9. The system according to claim 8, wherein the second modulator is configured to provide a first logic value corresponding to a deviation of the oscillation frequency from the first frequency by said second quantity and is configured to provide a second logic value corresponding to a lack of oscillation deviation from said first frequency.

10. The system according to claim 6, wherein said second frequency has a different value than the first frequency such as to ensure that no interference exists between a radiation field at the first frequency and a radiation field at the second frequency.

11. The system according to claim 6, wherein said second signal has a reduced power content such as to obtain a signal/noise ratio higher than 20 decibels.

12. The system according to claim 6, wherein said second frequency is lower than one-fourth of the first frequency.

13. A method, comprising:

provide full-duplex communication between an apparatus and external devices, the apparatus including first and second resonant circuits, a demodulator, and a modulator that are configured to provide the full-duplex communication with the external devices, the providing including:

wirelessly receiving, using the first resonant circuit, a first signal having a power configured to charge a battery and including data, the first resonant circuit being configured to resonate at a first frequency and including a first coil;

wirelessly transmitting a second signal using the second resonant circuit, which is configured to resonate at a second frequency and includes a second coil;

demodulating, using the demodulator, the first signal to obtain the transmitted data and charge the battery with the power from the first signal; and modulating, using the modulator, the second frequency of said second signal for transferring data externally, wherein said modulator modulates said second signal by setting a frequency deviation by a determined quantity from said second frequency, said determined quantity being such as to prevent oscillation of the second resonant circuit from occurring outside a bell-shaped resonant curve centered on said second frequency and such as to prevent a frequency of the oscillation from being outside a bandwidth of the second resonant circuit.

14. The method according to claim 13, wherein said modulator provides a first logic value corresponding to a deviation of the oscillation frequency from the second frequency by said determined quantity and provides a second logic value corresponding to a lack of oscillation deviation from said second frequency.

15. The method according to claim 13, wherein said second frequency has a different value than the first frequency such as to ensure that no interference exists between a radiation field at the first frequency and a radiation field at the second frequency.

16. The method according to claim 13, wherein said second signal has a reduced power content such as to obtain a signal/noise ratio higher than 20 decibels.

17. The method according to claim 13, wherein said second frequency is lower than one-fourth of the first frequency.

* * * * *